Patented Sept. 11, 1923.

1,467,598

UNITED STATES PATENT OFFICE.

MAX WYLER, OF BLACKLEY, MANCHESTER, ENGLAND, ASSIGNOR TO BRITISH DYE-STUFFS CORPORATION, LIMITED, OF BLACKLEY, MANCHESTER, ENGLAND.

MANUFACTURE OF PHENYL GLYCINE COMPOUNDS.

No Drawing.     Application filed October 10, 1922. Serial No. 593,495.

*To all whom it may concern:*

Be it known that I, MAX WYLER, residing at Blackley, Manchester, in the county of Lancashire, England, a citizen of the Republic of Switzerland, have invented certain new and useful Improvements in the Manufacture of Phenyl Glycine compounds, of which the following is a specification.

This invention relates to the manufacture of phenyl glycine compounds and has for its object an improved process of manufacture. The manufacture of phenyl glycine compounds has hitherto been carried out by the action of trichlorethylene on aniline in a single technical operation. This is effected by heating these bodies in aqueous suspension with a body possessing an alkaline reaction, preferably milk of lime, under pressure at a temperature between 140–190° C. until the conversion of the intermediate bodies produced into phenyl glycine compounds was complete.

During the process various intermediate bodies were formed, among which was ethylene-triphenyl-triamine, a compound containing 3 molecules of aniline to 1 molecule trichlor-ethylene. This body on hydrolysis yielded phenyl glycine and aniline. In one manner of manufacture, phenyl glycine was prepared by the action of trichlor-ethylene on aniline using about 3 molecules of aniline to 1 molecule of trichlor-ethylene. The excess of aniline was distilled off. If it be attempted to use less aniline whilst in other respects following the same manipulation, the yield is seriously diminished.

Now I have found that the reaction can be carried out with equally good results using only one molecule of aniline plus a very slight excess, say, 5%, if care be taken that from the beginning to end of the process the trichlor-ethylene present always finds three molecules of aniline to react upon, some of which is continually provided by the formation of glycine compounds and aniline from the intermediate products. This can be achieved by gradually pumping 1 molecule of trichlor-ethylene into a mixture of 1 molecule (plus 5%) aniline, and milk of lime, keeping the temperature of the pressure vessel at 170–180° C.

The following example will serve to illustrate further the nature of the invention, but the invention is not restricted to this example.

*Example.*

412 parts of aniline, slacked lime containing 504 parts of CaO, 2000 parts of water, are heated in an autoclave with agitator to 170° C. and during 10 hours, 555 parts of trichlor-ethylene are pumped in, small amounts of unchanged aniline are distilled off and the remaining calcium salt of the phenyl glycine worked up as usual.

What I claim and desire to secure by Letters Patent is:—

1. The process of manufacturing phenyl glycine compounds which consists in gradually pumping one molecular proportion of trichlor-ethylene into a mixture containing a very slight quantity in excess of one molecular proportion of aniline and a body possessing an alkaline reaction under pressure, keeping the temperature of the pressure vessel between 170° to 180° C., substantially as described.

2. The process of manufacture of phenyl glycine compounds which consists in gradually pumping one molecular proportion of trichlor-ethylene into a mixture of 5% more than one molecular proportion of aniline, slacked lime and water, heated with stirring to 170° to 180° C., distilling small amounts of unchanged aniline and working up the remaining calcium salt of the phenyl glycine in the known manner.

3. The process of manufacture of phenyl glycine compounds which consists in gradually pumping during 10 hours 555 parts of trichlor-ethylene in a mixture of 412 parts of aniline, slacked lime containing 504 parts of CaO and 2000 parts of water, heated to 170° C. in an autoclave provided with an agitator, distilling small amounts of unchanged aniline, and working up the remaining calcium salt of the phenyl glycine in the known manner.

In testimony whereof I have signed my name to this specification.

MAX WYLER.